D. FISHER.
Fishway.

No. 206,715.     Patented Aug. 6, 1878.

WITNESSES:
Henry N. Miller
C. Sedgwick

INVENTOR:
D. Fisher
BY Munn & Co
ATTORNEYS.

UNITED STATES PATENT OFFICE.

DANIEL FISHER, OF CAIRO, PENNSYLVANIA.

IMPROVEMENT IN FISHWAYS.

Specification forming part of Letters Patent No. 206,715, dated August 6, 1878; application filed July 12, 1878.

*To all whom it may concern:*

Be it known that I, DANIEL FISHER, of Cairo, in the county of Union and State of Pennsylvania, have invented a new and Improved Fishway, of which the following is a specification:

The object of my invention is to provide a device for checking the current of water at dams in rivers or creeks for allowing fish to pass, whereby migratory fish may travel up streams during the spawning season.

My invention consists in a trunk or chute provided with dams or ledges, placed alternately at the sides of the chute, to check the current and form a sinuous passage for the water, whereby a channel is made for the fish to pass up or down; and the shape of the ledges is such that a wider channel is allowed in proportion to the depth of water.

Figure 1:
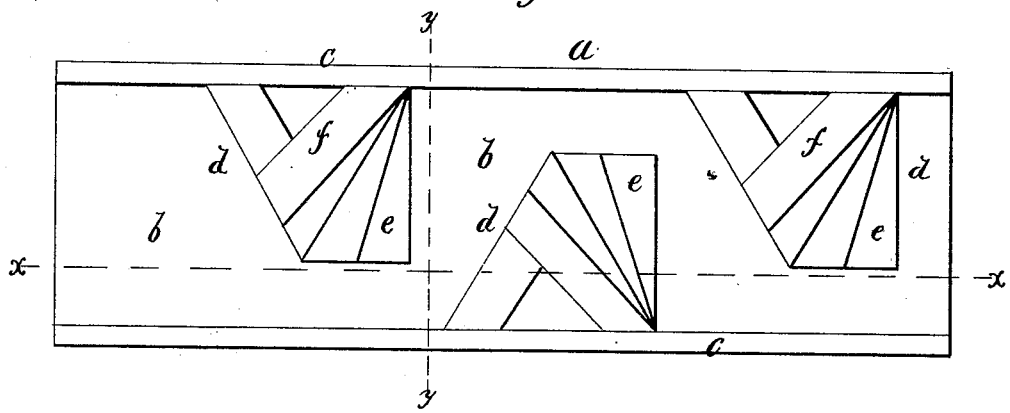
Figure 2:
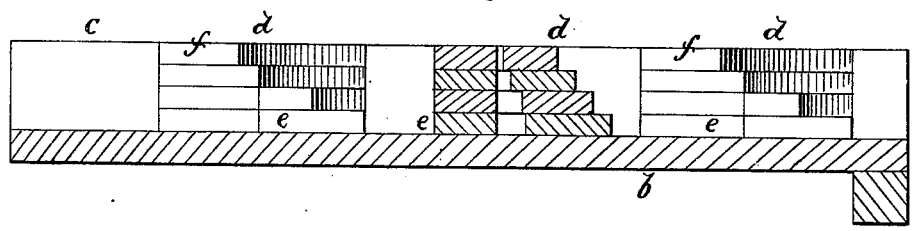
Figure 3:
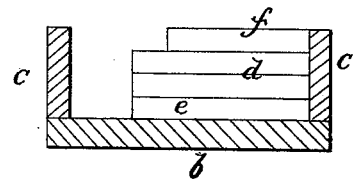

In the drawing, Figure 1 is a plan of my improved fishway. Fig. 2 is a longitudinal section of the same at the line $x\,x$, and Fig. 3 is a cross-section at the line $y\,y$.

Similar letters of reference indicate corresponding parts.

$a$ is a trunk or chute of the desired size, having a bottom, $b$, and sides $c$. $d\,d$ are series of offsets or ledges, projecting alternately from the sides $c\,c$. These offsets present an inclined surface to the current through the chute, and the bottom one, $e$, of each series is the largest, and will confine the water to a narrow channel, while the passage enlarges for a greater quantity of water. This enlargement is obtained by gradually decreasing the size of the offsets in each series, the top one, $f$, being smallest, and allowing the water to escape most rapidly. The result of this is, that the current at the bottom is the most broken, and with a small quantity of water it will be deep enough to permit the fish to pass, while a larger supply of water may go through more readily.

The water, in its passage through the chute $a$, is caused by the ledges to take a sinuous course from one side of the chute to the other, thus affording an easy angle for the fish to ascend.

I prefer to form the chute and offsets of wood and stone, and to construct the ledges from strips, put together as shown.

I do not limit myself to the number of ledges in the series, or their distance apart, as those particulars may be varied without departing from my invention.

Having thus described my invention, I claim as new and desire to secure by Letters Patent—

The series of inclined ledges or offsets, diminishing in size from the bottom to the top in each series, in combination with the spout or chute $a$, substantially as and for the purposes set forth.

DANIEL FISHER.

Witnesses:
D. R. JOHNSTON,
EDMUN LOMISON.